L. B. HORNER.
ATTACHMENT FOR MOWING MACHINES.
APPLICATION FILED JAN. 24, 1919.
1,309,522.
Patented July 8, 1919.
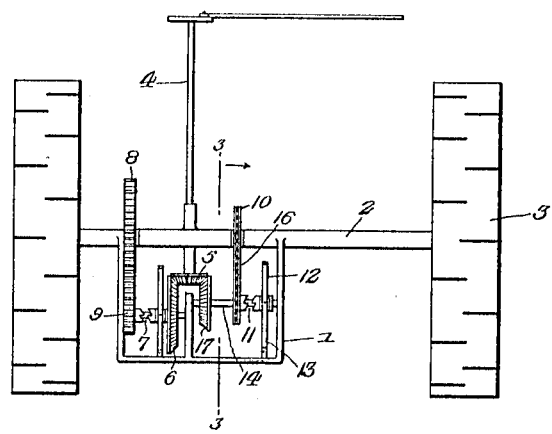
Fig. 1.
Fig. 2.
Fig. 3.
Inventor
L. B. Horner,
Witnesses
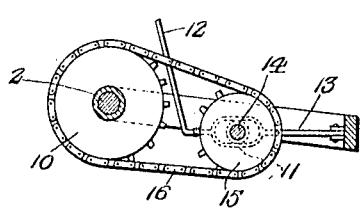
Attorney

UNITED STATES PATENT OFFICE.

LORENZO B. HORNER, OF HAMMOND, INDIANA.

ATTACHMENT FOR MOWING-MACHINES.

1,309,522.                Specification of Letters Patent.        Patented July 8, 1919.

Application filed January 24, 1919. Serial No. 272,893.

*To all whom it may concern:*

Be it known that I, LORENZO B. HORNER, a citizen of the United States, residing at Hammond, in the county of Lake and State of Indiana, have invented new and useful Improvements in Attachments for Mowing-Machines, of which the following is a specification.

This invention relates to a novel attachment for mowing machines, whereby the cutting knife may be driven at different speeds and the principal object of the invention is to provide means for connecting the driving gear on the pitman drive shaft with the axle whereby said shaft will be driven at a lower speed than when driven by the usual gear.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a plan view of a portion of a mowing machine to which my invention is applied.

Fig. 2 is an enlarged view of the arrangement of gears.

Fig. 3 is a section on line 3—3 of Fig. 1.

In these views, 1 indicates the frame of the mowing machine, 2 the axle thereof and 3 the wheels attached to the axle. 4 indicates the pitman driving shaft provided with the gear 5, this gear being engaged by the gear 6 on the stub shaft 7. This shaft 7 is driven from the axle by means of the large gear 8 on said axle, meshing with the gear 9 on said shaft 7. This train of gears is provided with suitable clutch means whereby they may be thrown into and out of mesh. This part of the machine is well known and forms no part of my invention. The means just described will drive the cutter blade at high speed and it is the object of my invention to drive said blade at a lower speed. To do this I place a chain wheel 10 on the axle 2 and said wheel is connected with a chain wheel 15 which is carried by a stub shaft 14, suitably journaled in the frame of the machine. The wheel 15 is provided with clutch means 11 for engaging it with the shaft 14, said clutch means being operated by the lever 13 which is provided with a handle part 12. The shaft 14 carries a gear 17 which meshes with the gear 5. The gearings just described are so proportioned as to drive the cutting blade at a lower speed than the gearing before described. In this way the low gear can be used in thin hay so as to lighten the load on the team. I prefer to make the clutch operating lever so it may be actuated by the foot so that the gears may be thrown to and out of mesh with the least possible effort.

It is thought from the foregoing description that the advantages and novel features of my invention will be readily apparent.

I desire to be understood that I may make changes in the construction and in the combination and arrangement of the several parts, provided that such changes fall within the scope of the appended claim.

Having described the invention, what is claimed is:

The combination with the axle and driving shaft of a mowing machine, of a pair of stub shafts journaled in the frame of the machine, gears of different diameters connecting said stub shafts with the driving shaft, gears connecting one of said stub shafts with the axle, a chain wheel on the other stub shaft, a like wheel on the axle, a chain connecting said wheels and clutch means on the stub shafts for connecting the same with their driving means.

In testimony whereof I affix my signature.

LORENZO B. HORNER.

Copies of this patent may be obtained for five cents each, by addressing the "Commissioner of Patents, Washington, D. C."